2,752,222

PREPARATION OF POTASSIUM BICARBONATE

Antoine Birman, Paris, France, assignor to Societe d'Etudes Chimiques pour l'Industrie et l'Agriculture, Paris, France No Drawing. Application March 29, 1951, Serial No. 218,270

Claims priority, application France April 5, 1950

8 Claims. (Cl. 23—64)

This invention relates to the preparation of potassium carbonates, and its object is to produce potassium carbonates by the action of carbonic acid gas on potassium chloride with high yield and economy.

It is well-known that any attempt at producing potassium bicarbonate by a double displacement reaction between potassium chloride and ammonium carbonate, that is by a reaction similar to that used in the Solvay process of making sodium bicarbonate in which sodium chloride would be replaced by potassium chloride, fails regardless of the operative conditions used, because the reaction $$KHCO_3 + NH_4Cl \rightarrow KCl + NH_3 + CO_2 + H_2O$$

occurs always in the same direction.

It is known on the other hand that if trimethylamine is used instead of ammonia as the starting material, reaction in the desired direction does proceed, and that potassium bicarbonate can in fact thus be produced by a double displacement reaction. This method, though discovered as far back as 1878, has, however, never been applied in industrial practice.

A remarkable improvement has now been discovered in this old process, which results in rendering this process fit for industrial operations, producing potassium bicarbonate having excellent commercial characteristics with a high yield and under very economical conditions.

In effect, I have discovered that if the old process involving the use of trimethylamine, either pure or commercial, be used, the process will produce but insignificant yields.

When I carried out experiments employing either primary or secondary amines, that is for example, with monomethylamine, or dimethylamine, or monoethylamine or diethylamine, either pure or mixtures thereof, but not excluding trimethylamine, I discovered that the results obtained were altogether different from that obtained with trimethylamine, pure or commercial—contrary to that which would have been expected.

The improved method according to the invention essentially consists of reacting potassium chloride with carbonic acid gas, water and an amine reagent which may be a primary or a secondary amine in aqueous solution, or a solution of a mixture of said amines. The said amine reagent is instantly converted into amine carbonate in the presence of the carbonic acid gas. The reaction then proceeds according to one of the following equations, depending on the type of amines used:

$$2KCl + (NH_2R'H)_2CO_3 + CO_2 + H_2O \rightarrow$$
$$2KHCO_3 + 2NH_2R'.HCl$$
$$2KCl + (NHR_2H)_2CO_3 + CO_2 + H_2O \rightarrow$$
$$2KHCO_3 + 2NHR_2.HCl$$

wherein R and R' are alkyl radicals, for example ethyl or methyl. The potassium bicarbonate precipitates in the form of particles large enough for the the product to be readily separable from the mother-liquor. The mother-liquor contains both the unreacted amine carbonate and the alkyl ammonium hydrochloride formed. The initial amine reagent is easily recovered from this mixture, for instance by the action of lime which releases the alkylamine in gaseous form, and the latter may be reused in a fresh operation.

The potassium bicarbonate precipitate separated may be converted into potassium carbonate by any known method.

The process of this invention has one particularly advantageous industrial application in the preparation of potassium bicarbonate from raw potassium chloride, such for example as is obtained in the extraction of potassium salts from naturally-occurring sylvinite.

Any mixture of light, i. e., volatile primary and/or secondary amines or any primary or secondary amine may be employed as the amino reagent. As a typical amine mixture yielding highly satisfactory results, the raw products obtained by reaction of ammonia with an alcohol, a reaction which is at present widely used, may be mentioned. This reaction occurs at high temperature, about 400° C., in the presence of suitable catalysts. It yields, depending on the operating conditions used, an alkylamine or a mixture of alkylamines more or less rich in one of the components, accompanied by ammonia. These light volatile amines, which are very cheaply available, are perfectly suitable for use as the amino reagent in performing the method of the invention.

As an illustration of the invention, two exemplary procedures will now be described, it being understood that such examples should not be interpreted as restricting the scope of the invention in any way.

*Example 1.*—200 cc. of a 25% monomethylamine solution, providing the amino reagent, are carbonated by a flow of carbonic acid gas, while cooling energetically. The reaction is allowed to proceed until no more heat is evolved. The solution thus treated is placed in a pressure-vessel with 68 grams of potassium chloride of "technical" grade and agitated while bubbling carbonic acid gas therethrough under a pressure of 3 kg./sq. cm. (about 43 p. s. i.) at ordinary temperature. At the end of two hours, a precipitate is separated containing 94% potassium bicarbonate. The yield in potassium is 90%. The regeneration of the amines from the mother liquor may be effectuated in two steps. In a first exhausting-rectifying column there are removed the carbon dioxide and the amines which did not react upon the potassium chloride. The hydrochlorides are neutralized with from one to two times the theoretical quantity of milk of lime. The amine is then distilled in a second column, there being obtained at the head of the column, a concentrated solution of the amine. The distillates of the two columns may be combined and returned to the initial stage of the reaction in a recycling operation. The regeneration of the amine may likewise be effectuated in a single step in accordance with the procedure described in Example 2.

*Example 2.*—By reacting ammonia with methyl alcohol at a temperature of 400° C. in the presence of activated alumina as a catalyst, there is obtained a mixture of amines, said mixture of amines containing less than 2% of trimethylamine is carbonated by a flow of gaseous carbon dioxide bubbled therethrough. 200 cc. of this solution, in which the alkaline content, in the form of amines, is 25%, are reacted with 51 grams of raw potassium chloride containing 3% NaCl. Carbonic acid gas is bubbled through this mixture under a pressure of about 43 p. s. i. at ordinary temperature. At the end of two hours, a precipitate is obtained in which 95% of the initial potassium are recovered in the form of potassium bicarbonate containing 3% sodium bicarbonate. To effectuate the regeneration of the amine, the same may be done by using a single distilling column. Milk of lime is introduced in a lower part of the distilling column where it comes into contact with the crude mother liquor. The reactive amine is recovered at the head of the column in aqueous solution. The concentration of this solution can be regulated by adjusting the height of the rectification in the column. The regeneration of the amine may also be effected in two stages in accordance with the method described in Example 1.

What is claimed is:

1. The method of producing potassium bicarbonate which comprises reacting gaseous carbon dioxide with an aqueous solution consisting essentially of potassium chloride and an amine of the group consisting of monomethylamine, dimethylamine, monoethylamine, and diethylamine and mixtures thereof, and separating the resulting precipitated bicarbonate from the solution.

2. The method in accordance with claim 1 wherein the reaction is carried out under a pressure of about 3 kg./cm.$^2$.

3. The method of producing potassium bicarbonate which comprises reacting gaseous carbon dioxide with an aqueous solution consisting essentially of potassium chloride and an amine of the group consisting of monomethylamine, dimethylamine, monoethylamine and diethylamine, and mixtures thereof, in admixture with ammonia, and separating the resulting precipitated bicarbonate from the solution.

4. The method in accordance with claim 3 wherein the reaction is carried out at a pressure of about 3 kg./cm.$^2$.

5. The method of producing potassium bicarbonate which comprises reacting gaseous carbon dioxide with an aqueous solution consisting essentially of potassium chloride and monoethylamine and diethylamine, and separating the resulting precipitated potassium bicarbonate from the solution.

6. The method of producing potassium bicarbonate which comprises reacting carbon dioxide with an aqueous solution consisting essentially of potassium chloride and monoethylamine and diethylamine, in admixture with ammonia, and separating the resulting precipitated potassium bicarbonate from the solution.

7. The method of producing potassium bicarbonate which comprises reacting gaseous carbon dioxide with an aqueous solution consisting essentially of potassium chloride and monoethylamine, and separating the resulting precipitated potassium bicarbonate from the solution.

8. The method of producing potassium bicarbonate which comprises reacting gaseous carbon dioxide with an aqueous solution consisting essentially of potassium chloride and diethylamine, and separating the resulting precipitated potassium bicarbonate from the solution.

References Cited in the file of this patent

UNITED STATES PATENTS

| | | |
|---|---|---|
| 1,716,663 | Pike | June 11, 1929 |
| 1,770,995 | Pike | July 22, 1930 |
| 1,794,260 | Thorssell | Feb. 24, 1931 |
| 1,928,540 | Lawaree | Sept. 26, 1933 |
| 2,002,681 | Thorssell | May 28, 1935 |
| 2,013,977 | Weiss | Sept. 10, 1935 |
| 2,378,147 | McGeorge | June 12, 1945 |

FOREIGN PATENTS

| | | |
|---|---|---|
| 3,967 | Great Britain | A. D. 1878 |

OTHER REFERENCES

"An Outline of Organic Chemistry," page 142, by Degering, Nelson and Harrod (fourth ed.), Barnes & Noble, Inc., New York.